(12) United States Patent
Zhao et al.

(10) Patent No.: US 11,586,081 B2
(45) Date of Patent: Feb. 21, 2023

(54) ARRAY SUBSTRATE AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Yanli Zhao, Beijing (CN); Xiaoji Li, Beijing (CN); Zhihui Wang, Beijing (CN); Changgong Zhu, Beijing (CN); Jianghong Wen, Beijing (CN); Xiaolong Liu, Beijing (CN); Keguo Liu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 342 days.

(21) Appl. No.: 16/500,725

(22) PCT Filed: Feb. 22, 2019

(86) PCT No.: PCT/CN2019/075920
§ 371 (c)(1),
(2) Date: Oct. 3, 2019

(87) PCT Pub. No.: WO2020/168560
PCT Pub. Date: Aug. 27, 2020

(65) Prior Publication Data
US 2021/0333661 A1   Oct. 28, 2021

(51) Int. Cl.
*G02F 1/1362* (2006.01)
*G02F 1/1343* (2006.01)

(52) U.S. Cl.
CPC ...... *G02F 1/136209* (2013.01); *G02F 1/1343* (2013.01)

(58) Field of Classification Search
CPC .............. G02F 1/136209; G02F 1/1343
See application file for complete search history.

(56) References Cited

U.S. PATENT DOCUMENTS

| | | | |
|---|---|---|---|
| 7,532,280 B2 | 5/2009 | Yoshida et al. | |
| 8,982,307 B2 | 3/2015 | Kim et al. | |
| (Continued) | | | |

FOREIGN PATENT DOCUMENTS

| | | |
|---|---|---|
| CN | 101539681 A | 9/2009 |
| CN | 101995705 A | 3/2011 |
| (Continued) | | |

OTHER PUBLICATIONS

First Chinese Office Action dated Apr. 7, 2022; Appln. No. 201980000189.5.

*Primary Examiner* — Lucy P Chien (57) ABSTRACT

The present disclosure provides an array substrate and a display device. The array substrate includes: a base substrate; and a plurality of pixel units disposed on the base substrate; each of the pixel units includes an active display region, the active display region of at least one of the pixel units is provided with a light-shielding layer, the light-shielding layer is located at an edge of the active display region, and a surface of a side of the light-shielding layer away from the base substrate is a reflecting surface. The light-shielding layer is disposed within an annular region, the annular region has a width in a range of 20 μm-50 μm, and an outer boundary of the annular region is a boundary of the active display region.

20 Claims, 3 Drawing Sheets

(56) References Cited

U.S. PATENT DOCUMENTS

| | | | |
|---|---|---|---|
| 10,795,228 B2 | 10/2020 | Yao et al. | |
| 10,871,672 B2 | 12/2020 | Wang et al. | |
| 2002/0060757 A1* | 5/2002 | Kiguchi | G02F 1/133516 |
| | | | 349/43 |
| 2008/0284719 A1* | 11/2008 | Yoshida | G02F 1/13392 |
| | | | 345/102 |
| 2012/0218501 A1* | 8/2012 | Lee | G02F 1/134309 |
| | | | 349/139 |
| 2013/0127339 A1* | 5/2013 | Mishima | H01L 27/3225 |
| | | | 315/71 |
| 2014/0125909 A1* | 5/2014 | Kim | G02F 1/136209 |
| | | | 349/46 |
| 2017/0184915 A1* | 6/2017 | Yang | G02F 1/136286 |
| 2018/0307089 A1* | 10/2018 | Igeta | G02F 1/133512 |

FOREIGN PATENT DOCUMENTS

| | | | |
|---|---|---|---|
| CN | 102645803 A | 8/2012 | |
| CN | 106707596 A | 5/2017 | |
| CN | 107390444 A | 11/2017 | |
| CN | 107632453 A | 1/2018 | |

\* cited by examiner

ARRAY SUBSTRATE AND DISPLAY DEVICE

TECHNICAL FIELD

At least one embodiment of the present disclosure relates to an array substrate and a display device.

BACKGROUND

At present, a market share of "hard screen" display device has been gradually increased. The "hard screen" display device is an in-plane switching liquid crystal display device. By taking an Advanced Super Dimension Switch (ADS) display mode as an example, it possesses characteristics of "hard screen", wide viewing angle, high color saturation and the like because of its normal black mode and its way of achieving display function by horizontal rotation of liquid crystal molecules.

SUMMARY

At least one embodiment of the present disclosure provides an array substrate, including: a base substrate; and a plurality of pixel units disposed on the base substrate; each of the plurality of pixel units includes an active display region, the active display region of at least one of the plurality of pixel units is provided with a light-shielding layer, the light-shielding layer is located at an edge of the active display region, and a surface of the light-shielding layer away from the base substrate is a reflecting surface. The light-shielding layer is disposed within an annular region, the annular region has a width in a range of 20 μm-50 μm, and an outer boundary of the annular region is a boundary of the active display region.

For example, the light-shielding layer is disposed within the annular region having a width of 20 μm.

For example, a region in the active display region surrounded by the annular region is a light-transmitting region.

For example, the light-shielding layer has an annular shape.

For example, the light-shielding layer is a ring having a width in a range of 15 μm-40 μm.

For example, an outer boundary of the light-shielding layer is coincident with the outer boundary of the annular region.

For example, the plurality of pixel units includes a display electrode which is a planar electrode. An orthographic projection of the display electrode on the base substrate overlaps with an orthographic projection of the light-shielding layer on the base substrate.

For example, the light-shielding layer is located at a side of the display electrode away from the base substrate.

For example, the display electrode includes at least one of the pixel electrode and a common electrode, and one display electrode close to the light-shielding layer is electrically connected with the light-shielding layer.

For example, a distance from the display electrode electrically connected with the light-shielding layer to the base substrate and a distance from the light-shielding layer to the base substrate have a difference smaller than 1 μm.

For example, the light-shielding layer is located between the display electrode and the base substrate.

For example, a transparent insulating layer is disposed between the display electrode and the light-shielding layer, and a material of the transparent insulating layer includes a mixture of barium titanate and polyimide.

For example, a thickness of the transparent insulating layer is in a range of 0.1 μm-0.5 μm.

For example, a thickness of the light-shielding layer is in a range of 0.1 μm-0.5 μm.

At least one embodiment of the present disclosure provides a display device, including: the array substrate described above, an opposing substrate, and a liquid crystal layer located between the array substrate and the opposing substrate. A thickness of a portion of the liquid crystal layer located in the annular region is substantially the same with a thickness of a portion of the liquid crystal layer located in a light-transmitting region surrounded by the annular region, and the display device is a normal black display device.

BRIEF DESCRIPTION OF THE DRAWINGS

In order to clearly illustrate the technical solutions of the embodiments of the present disclosure, the drawings of the embodiments will be briefly described in the following. Apparently, the described embodiments are just a part but not all of the embodiments of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

During research, an inventor of the present application has found that, by taking the ADS display mode as an example, according to the display characteristics thereof, liquid crystal molecules under a black screen (L0) would be aligned by following a rubbing direction of an alignment film (PI). After an alignment direction of the alignment film is destroyed, in a case that there is no guidance of a driving electric field, the liquid crystal molecules may be aligned in a disordered manner, resulting in an occurrence of light leakage phenomenon because of light transmitting through the display device. In a case where the position of light leakage corresponds to blue sub-pixels, the leaked light is blue light, and a "blue spot" phenomenon may be occurred in the display device; in a case where the position of light leakage corresponds to other types of sub-pixels, a "red spot" or "green spot" phenomenon may be occurred in the display device. The alignment film may be scratched due to a local displacement of an array substrate and an opposing substrate resulted by an external stress and a segment gap (e.g., a segment gap resulted by an unevenness of a surface of a housing of a display screen interfacing with the display screen); for example, the local displacement of the array substrate and the opposing substrate may be caused by a sharp object compressing the display device or a collision with a region having a relatively greater segment gap, which results in that a spacer (PS) slides into a display region and scratches the alignment film in the display region. At present, solutions for solving the scratching problem usually are to reform the production line, to manage and control the manufacturing method, and to modify the system segment gap (e.g., by planarization of the surface of the housing of display screen interfacing with the display screen as far as possible). However, these solutions cannot solve the problem fundamentally.

Figure 1A:
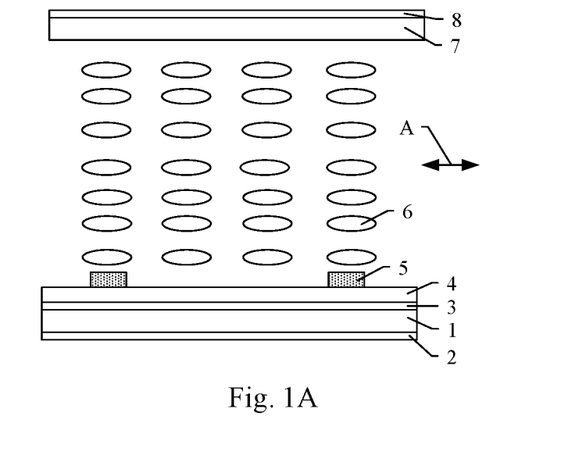
FIG. 1A is a partial structural view of a display device under normal black mode.
Figure 1B:
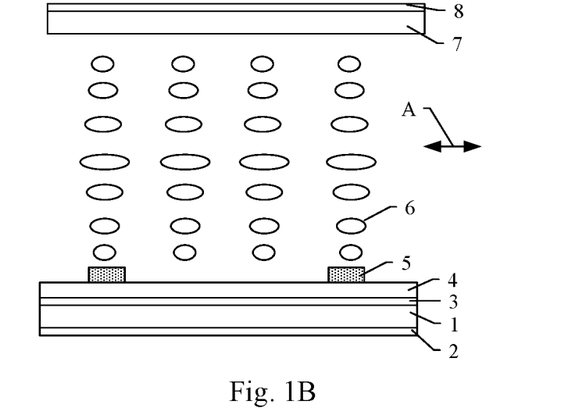
FIG. 1B is a structural view of the display device illustrated in FIG. 1A under display mode.

FIG. 1A is a partial structural view of a display device under normal black mode, and FIG. 1B is a structural view of the display device illustrated in FIG. 1A under display mode. As illustrated in FIG. 1A and FIG. 1B, the display device is in an Advanced Super Dimension Switch (ADS) display mode. The display device includes an array substrate, an opposing substrate 7, and a liquid crystal layer 6 located between the array substrate and the opposing substrate 7. The array substrate includes: a base substrate 1; a common electrode 3 and a pixel electrode 5 which are located at a side of the base substrate 1 facing the liquid crystal layer 6; and a transparent insulating layer 4 disposed between the common electrode 3 and the pixel electrode 5. A lower polaroid 2 is disposed at a side of the array substrate away from the liquid crystal layer 6, and an upper polaroid 8 is disposed at a side of the opposing substrate 7 away from the liquid crystal layer 6. An alignment film (not illustrated) is further disposed at a side of the array substrate facing the liquid crystal layer 6 and at a side of the opposing substrate 7 facing the liquid crystal layer 6, and liquid crystal molecules are aligned along an alignment direction (direction A) of the alignment film.

As illustrated in FIG. 1A, upon both of the common electrode 3 and the pixel electrode 5 being applied with a voltage of 0V, the liquid crystal molecules would not change, that is, the liquid crystal molecules are still aligned along the alignment direction (direction A); in this case, because a polarization axis of the upper polaroid 8 is perpendicular to a polarization axis of the lower polaroid 2, no light would be emitted from the display device, and the display device displays a black screen. As illustrated in FIG. 1B, upon the pixel electrode 5 being applied with a driving voltage, an electric field generated between the pixel electrode 5 and the common electrode 3 drives the liquid crystal molecules to rotate along a direction parallel to the base substrate, and a double refraction phenomenon would be occurred in linearly polarized light emergent from the lower polaroid 2 disposed at the side of the array substrate away from the liquid crystal layer 6, thus the linearly polarized light can exit from the upper polaroid 8 disposed at the side of the opposing substrate 7 away from the liquid crystal layer 6, so as to realize the display function.

Figure 1C:
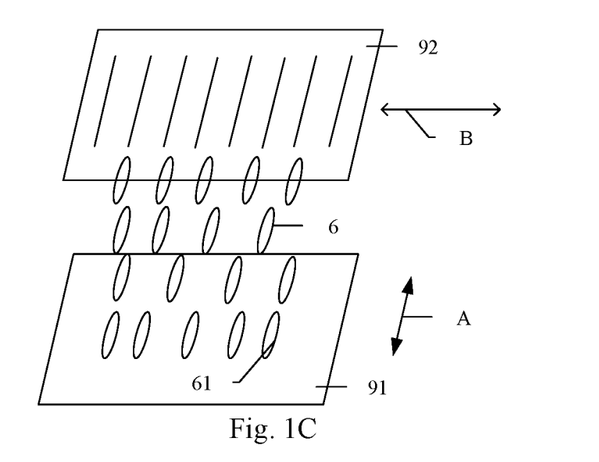
FIG. 1C is a structural view illustrating an alignment film and a liquid crystal layer in the display device illustrated in FIG. 1A.
Figure 1D:
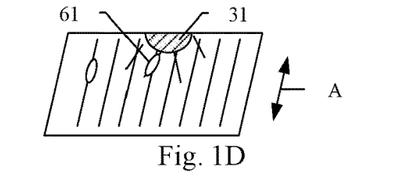
FIG. 1D is a schematic view illustrating an alignment direction of an alignment film illustrated in FIG. 1C when scratched.

FIG. 1C is a structural view illustrating an alignment film and a liquid crystal layer in the display device illustrated in FIG. 1A, and FIG. 1D is a schematic view illustrating an alignment direction of the alignment film illustrated in FIG. 1C when the alignment film is scratched. As illustrated in FIG. 1C, upon the common electrode and the pixel electrode being applied with a relative voltage of 0V (that is, a difference between the voltage applied to the common electrode and the voltage applied to the pixel electrode is 0V), the liquid crystal molecules 61 still are aligned along an alignment direction (direction A) of the alignment film 91 and 92 without rotating. Because the liquid crystal molecules 61 are aligned along the alignment direction (direction A), and directions of polarization axes of the two polaroids located at two sides of the liquid crystal layer 6 are direction A and direction B, respectively, when the liquid crystal molecules are not rotated, a polarization direction of light entering the liquid crystal layer 6 through the lower polaroid is parallel to the polarization axis of the lower polaroid, the polarized light incident into the upper polaroid cannot exit from the upper polaroid, and the display device displays a black screen.

As illustrated in FIG. 1C, after performing an alignment process to the alignment film (an alignment direction is schematically illustrated on the alignment film 92 but is not illustrated on the alignment film 91), e.g., a rubbing alignment process, liquid crystals on a surface of the alignment film have a certain pre-tilt angle and an orientation angle, and the liquid crystals are arranged along the rubbing direction. The alignment direction on the alignment film is uniform, for example, the direction A.

As illustrated in FIG. 1D, a spacer 31 slides into a display region due to a local displacement of the array substrate and the opposing substrate, so that an alignment direction at a local position of the alignment film is destroyed, for example, the alignment direction is no longer the direction A, after the alignment film is scratched by the spacer 31, which results in that the liquid crystal molecules 61 in this region are not aligned along the original alignment direction any more, and a disordered deflected angle $\Phi'$ is generated. A transmittance formula under the ADS mode can be expressed as: $T=T_0 \sin^2(2\Phi)\sin^2(\Delta n d * \pi / \lambda)$, where $\Phi$ is a deflected angle of the liquid crystal molecule with respect to the alignment direction, d is a thickness of the liquid crystal layer, and $\Delta n$ is a difference in birefringent indexes of the liquid crystal molecules.

A defection of "blue spot" is easily to be occurred under a black screen (L0) of an ADS liquid crystal display device due to its display performance of in-plane switching, during production line operation and reliability test. When the display device is in a dark state, $\Phi=0$, thus the transmittance is 0. Upon the disordered deflected angle $\Phi'$ being generated, the Φ in the transmittance formula above is not zero so that the transmittance T is changed; that is, the transmittance T is no longer zero. In such case, a light leakage phenomenon is occurred in the display device. Because most of the spacers are disposed at positions of gate lines corresponding to blue sub-pixels, when the alignment film is scratched by the spacers, liquid crystal molecules located in the active display region of the blue sub-pixel would generate a disordered deflected angle to cause a leakage of blue light; as a result, the "blue spot" phenomenon is occurred.

Embodiments of the present disclosure provide an array substrate and a display device. The array substrate includes: a base substrate; and a plurality of pixel units disposed on the base substrate. Each of the pixel units includes an active display region, the active display region of at least one of the pixel units is provided with a light-shielding layer, the light-shielding layer is located at an edge of the active display region, and a surface of a side of the light-shielding layer away from the base substrate is a reflecting surface. The light-shielding layer is disposed in an annular region having a width of 20 μm-50 μm, and an outer boundary of the annular region is an outer boundary of the active display region. The light-shielding layer disposed in the array substrate not only can alleviate the "blue spot" phenomenon occurred in the display device, but also can reflect external ambient light to achieve the objective of increasing a contrast ratio of the display device and protecting eyesight.

Hereinafter, the array substrate and the display device provided by the embodiments of the present disclosure will be described in conjunction with the drawings.

Figure 2:
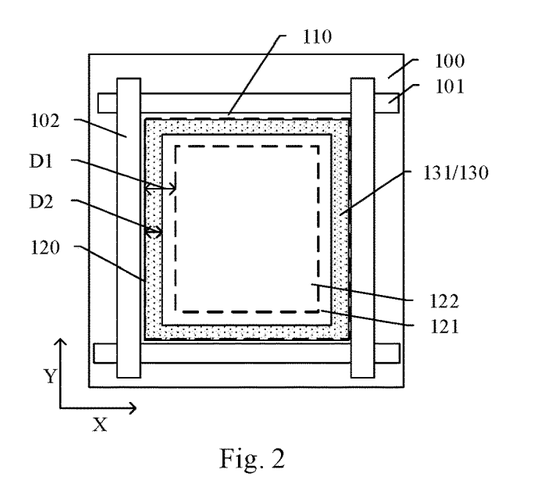
FIG. 2 is a plan view illustrating a partial structural of an array substrate provided by an embodiment of the present disclosure.

FIG. 2 is a plan view illustrating a partial structural of an array substrate provided by an embodiment of the present disclosure. As illustrated in FIG. 2, the array substrate includes a base substrate 100 and a plurality of pixel units 110 disposed on the base substrate 100. FIG. 2 schematically illustrates one pixel unit 110 defined by gate lines 101 extending along the X direction and data lines 102 extending along the Y direction which are intersected with each other. Each of the pixel units 110 includes an active display region 120, and the active display region 120 of at least one of the pixel units 110 is provided with a light-shielding layer 130. The light-shielding layer 130 is located at an edge of the active display region 120, and a surface of a side of the light-shielding layer 130 away from the base substrate 100 is a reflecting surface 131. The light-shielding layer 130 is disposed within an annular region 121 having a width of 20 μm-50 μm, and an outer boundary of the annular region 121 is a boundary of the active display region 120; that is, the light-shielding layer 130 is disposed within an annular region 121 which is located at an edge of the active display region 120 and has a width of 20 μm-50 μm. A region in the active display region 120 that is surrounded by the annular region 121 is a light-transmitting region 122; that is, the active display region 120 includes a light-transmitting region 122 and an annular region 121 located around the light-transmitting region 122.

The above-described active display region 120 refers to a region in the display device which is surrounded by a black matrix and configured for displaying; and a boundary of the active display region 120 is just an edge of the active display region 120 adjoined with the black matrix. The above-described "an outer boundary of the annular region 121 is a boundary of the active display region 120" refers to that, along a direction perpendicular to the base substrate, a boundary of an outer ring of the annular region is coincident with an edge of the black matrix adjoined with the active display region.

A spacer is liable to slide into an edge of the active display region due to a local displacement between the array substrate and the opposing substrate. Generally, the spacer is liable to slide into an annular region which is located at the edge of the active display region and has a width D1 not greater than 50 μm, for example, the annular region having a width of 20 μm. Therefore, the alignment film located in this annular region is liable to be scratched by the spacer, resulting in light leakage of the display device. In the embodiments of the present disclosure, a light-shielding layer is disposed in a region in which the alignment film is liable to be scratched, so that upon the alignment film being scratched to result in a disordered arrangement of liquid crystals at this region, the light-shielding layer is capable of blocking backlight of this region to prevent from the occurrence of light leakage.

Moreover, because a surface of a side of the light-shielding layer away from the base substrate is a reflecting surface, the ambient light that passes through the liquid crystal layer and incident into a surface of the reflecting surface would be reflected by the surface of the reflecting surface. For example, in a display device including the above-descried array substrate, a side of the liquid crystal layer away from the light-shielding layer is provided with a polaroid, the ambient light incident into the liquid crystal layer through the polaroid becomes linearly polarized light, and the linearly polarized light would not change its polarization direction when passing through the liquid crystal molecules which are not rotated. The linearly polarized light that is incident into the light-shielding layer and reflected by the reflecting surface becomes elliptically polarized light, the elliptically polarized light can pass through the above-described liquid crystal layer and the polaroid and then exit from a display side of the display device. When the display device including the array substrate provided by the present embodiment is in a high-contrast grayscale display mode, the light reflected by the reflecting surface of the light-shielding layer would exit from the display side of the display device to increase a display brightness of the annular region, and hence to reduce an influence to the display brightness resulted by the light-shielding layer which blocks the backlight.

The above-described reflecting surface of the light-shielding layer can adjust a display intensity of the display device according to a light intensity of the ambient light; that is to say, regardless of whether the ambient light is brighter or darker, the brightness of the display device can be increased to improve the contrast ratio between the displayed image and the ambient light. The display device including the above-described array substrate can utilize the light energy of the ambient light to realize energy-saving driving, so as to increase the optical utilization while protecting the eyesight. When the above-described reflecting surface of the light-shielding layer is used for reflecting the ambient light incident into the display device, an overall shape of the light-shielding layer can be non-rectangular shape, for example, an annular shape.

For example, in the case where the display device is in a black screen mode or low-contrast grayscale display mode, assuming that the ambient light is brighter, a reflective effect of the reflecting surface of the light-shielding layer is more obvious. In this way, the brighter ambient light can effectively shield the "blue spot" phenomenon, so that a light leakage at a scratched portion of the alignment film would be hardly observed, thereby mitigating the "blue spot" phenomenon. Assuming that the ambient light is darker, the amount of light reflected by the light-shielding layer is little but still can increase the contrast ratio between the displayed image and the ambient light so as to alleviate the "blue spot" phenomenon.

For example, as illustrated in FIG. 2, the light-shielding layer 130 is disposed in an annular region 121 having a width of 20 µm. The spacer usually is liable to slide into the annular region which is located at the edge of the active display region and has a width of 20 µm; as a result, by providing the light-shielding layer only in a region where the "blue spot" phenomenon is to be easily occurred, i.e., by providing the light-shielding layer specific to this region, it not only can effectively reduce the probability of occurrence of the "blue spot" phenomenon, but also can ensure an aperture ratio of the active display region as far as possible.

For example, as illustrated in FIG. 2, the light-shielding layer 130 has an annular shape, that is, the shape of the light-shielding layer 130 is as the same as the shape of the annular region 121, so as to block the backlight at positions where light leakage is to be easily occurred, as far as possible.

The present embodiment is not limited to an annular-shaped light-shielding layer, for example, a planar shape of the light-shielding layer can also be a regular shape such as square and circle, or other irregular shapes. By providing the light-shielding layer at the position in the annular region having high probability of occurrence of light leakage, it not only can decrease the probability of occurrence of the "blue spot" phenomenon but also can reduce an influence to the aperture ratio of the active display region.

For example, as illustrated in FIG. 2, because the position where the light leakage is occurred usually is an outer position close to the annular region 121, the light-shielding layer 130 is disposed at a position close to an outer edge of the annular region 121 so as to substantially block the position where the light leakage is to be easily occurred.

For example, the outer boundary of the light-shielding layer 130 is coincident with the outer boundary of the annular region 121, so as to block the position where the light leakage is occurred in a better way, and to reduce the influence to the aperture ratio of the active display region as far as possible.

For example, a minimum distance between an outer ring and an inner ring of the light-shielding layer 130 is in the range of 15 µm-40 µm; that is, the width of the light-shielding layer 130 is in the range of 15 µm-40 µm. For example, the width of the light-shielding layer 130 is in the range of 20 µm-30 µm. FIG. 2 schematically illustrates the case where the width D1 of the annular region 121 is 50 µm and the width D2 of the light-shielding layer 130 is 20 µm; the embodiments of the present disclosure are not limited thereto, and the width of the light-shielding layer can be determined according to the width of the annular region and the width of the position where light leakage is to be easily occurred.

For example, a material of the light-shielding layer 130 can adopt a metallic material, e.g., aluminum (Al), gold (Au), silver (Ag) or other materials having high reflectivity.

For example, a thickness of the light-shielding layer 130 is in the range of 0.1 µm-0.5 µm. For example, the thickness of the light-shielding layer 130 can be 0.1 µm. Under the premise of ensuring that the light-shielding layer is opaque, the thickness of the light-shielding layer can be designed as small as possible to prevent from obvious influence to the thickness of the array substrate and the overall thickness of the display device including the array substrate.

For example, the pixel unit provided with the light-shielding layer 130 includes a blue sub-pixel. Generally, the spacer is often disposed around the blue sub-pixel. Therefore, the light-shielding layer 130 can be provided only in an active display region of the blue sub-pixel. The present embodiment is not limited thereto, and the light-shielding layer can also be disposed in the active display region of green sub-pixels or red sub-pixels. That is to say, the pixel units in which the light-shielding layer is to be disposed can be determined by the position of the spacers, the amount of the spacers and the probability of scratching the alignment film. In this way, it not only can decrease the probability of occurrence of light leakage but also can reduce the influence to the aperture ratio of the active display region.

Figure 3A:
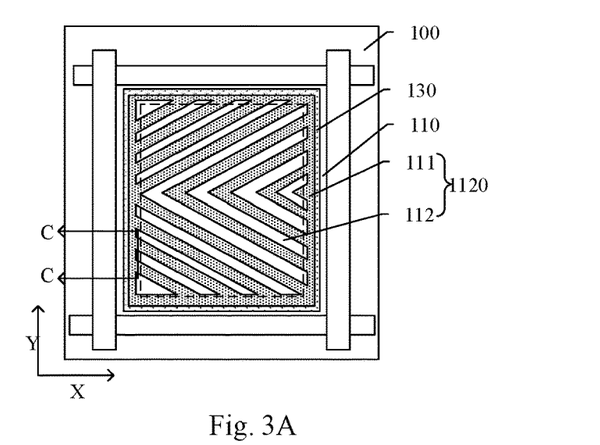
FIG. 3A is a plan view illustrating a partial structural of an array substrate provided by an example of an embodiment of the present disclosure.
Figure 3B:
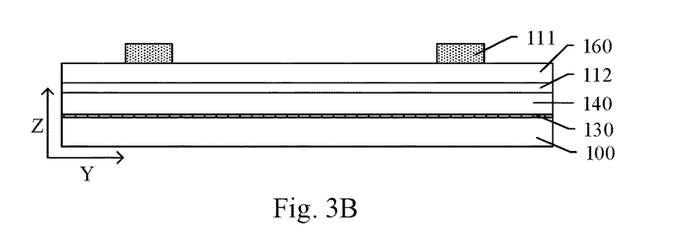
FIG. 3B is a partial cross-sectional view of the array substrate as illustrated in FIG. 3A taken along CC line.

For example, FIG. 3A is a plan view illustrating a partial structural of an array substrate provided by an example of an embodiment of the present disclosure, and FIG. 3B is a partial cross-sectional view of the array substrate as illustrated in FIG. 3A taken along CC line. As illustrated in FIG. 3A and FIG. 3B, the pixel unit 110 includes a display electrode 1120, and the display electrode 1120 is a substantially planar electrode; that is, for all positions on the display electrode 1120, a distance from a surface of the position facing the base substrate 100 to the base substrate 100 is substantially the same. An orthographic projection of the display electrode 1120 on the base substrate 100 overlaps with an orthographic projection of the light-shielding layer 130 on the base substrate 100.

For example, as illustrated in FIG. 3A and FIG. 3B, the display electrode 1120 includes at least one of a pixel electrode 111 and a common electrode 112. FIG. 3B schematically illustrates that the display electrode 1120 includes a pixel electrode 111 and a common electrode 112, that is, both of the pixel electrode 111 and the common electrode 112 are disposed on the base substrate 100, and an orthographic projection of at least one of the pixel electrode 111 and the common electrode 112 on the base substrate 100 overlaps with an orthographic projection of the light-shielding layer 130 on the base substrate 100. In FIG. 3A, by taking a light-shielding layer having an annular shape as an example, an inner boundary of the light-shielding layer is denoted by a dashed line box in the figure to indicate that, in a direction perpendicular to the base substrate, the display electrode overlaps with the light-shielding layer; that is to say, the orthographic projection of at least one of the pixel electrode and the common electrode on the base substrate overlaps with the orthographic projection of the light-shielding layer on the base substrate.

FIG. 3A and FIG. 3B describe the case where the pixel electrode 111 and the common electrode 112 both are disposed on the base substrate 100, by way of example, without limited thereto. It's also possible that, one of the pixel electrode and the common electrode is located on the base substrate, and the other one is located on the opposing substrate disposed opposite to the array substrate in the present embodiment.

For example, as illustrated in FIG. 3A and FIG. 3B, the common electrode 112 is an electrode covering the entire surface of the base substrate, the pixel electrode 111 is a strip electrode, and a transparent insulating layer 160 (a first transparent insulating layer 160) is disposed between the pixel electrode 111 and the common electrode 112. A thickness of the first transparent insulating layer 160 can be in the range of 0.1 µm-0.5 µm, and a material of the first transparent insulating layer 160 can adopt a mixture of barium titanate and polyimide, which has high dielectric constant (the dielectric constant can be up to 30), so as to reduce a loss of electric field generated between the pixel electrode 111 and the common electrode 112 at the first transparent insulating layer 160 and to lower a power consumption. The present example describes the case where the common electrode 112 is located at a side of the pixel electrode 111 facing the base substrate 100 by way of example.

For instance, in the example illustrated in FIG. 3A and FIG. 3B, the light-shielding layer 130 is located between the display electrode 1120 and the base substrate 100; that is to say, the light-shielding layer 130 is located between the base substrate 100 and one of the pixel electrode 111 and the common electrode 112 which is closer to the base substrate 100. For example, the light-shielding layer 130 is located at a side of the common electrode 112 away from the pixel electrode 111, that is, the light-shielding layer 130 is located between the common electrode 112 and the base substrate 100, so as to prevent the light-shielding layer from influencing the electric field applied on the liquid crystal molecules by the pixel electrode and the common electrode. Upon one of the common electrode and the pixel electrode being located on the array substrate, the light-shielding layer can be disposed between the base substrate and the electrode located on the base substrate.

For example, as illustrated in FIG. 3B, a transparent insulating layer 140 is disposed between the display electrode 1120 and the light-shielding layer 130; that is, the transparent insulating layer 140 (a second transparent insulating layer 140) is disposed between the light-shielding layer 130 and one of the pixel electrode 111 and the common electrode 112 which is closer to the light-shielding layer 130; and a material of the second transparent insulating layer 140 includes a mixture of barium titanate and polyimide, which has high dielectric constant. For example, the second transparent insulating layer 140 is disposed between the light-shielding layer 130 and one of the pixel electrode 111 and the common electrode 112 closer to the light-shielding layer 130, and the dielectric constant of the second transparent insulating layer 140 can be up to 30 by adopting the above-described material, so as to reduce the loss of electric field at the second transparent insulating layer 140 and to lower the power consumption.

For example, as illustrated in FIG. 3B, a thickness of the second transparent insulating layer 140 is in the range of 0.1 μm-0.5 μm, so as to reduce the thickness of the array substrate as far as possible.

In a case where the light-shielding layer is disposed between the display electrode and the base substrate, in order to ensure a substantially planar display electrode, the insulating layer located between the light-shielding layer and the display electrode can be used as a planarization layer, so that a distance from a portion of the display electrode located in the annular region to the base substrate is substantially the same with a distance from a portion of the display electrode located in the light-transmitting region to the base substrate.

Figure 4A:
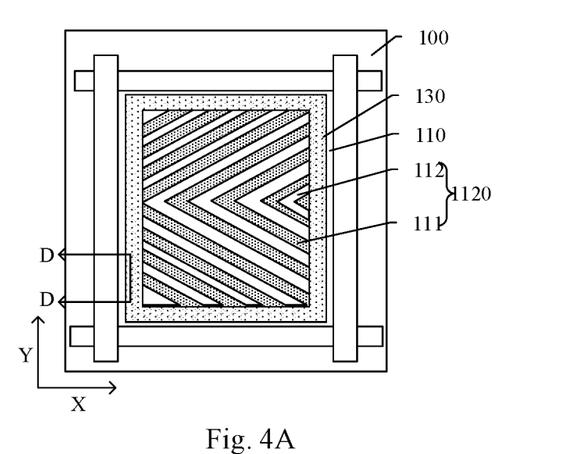
FIG. 4A is a plan view illustrating a partial structural of an array substrate provided by another example of an embodiment of the present disclosure.
Figure 4B:
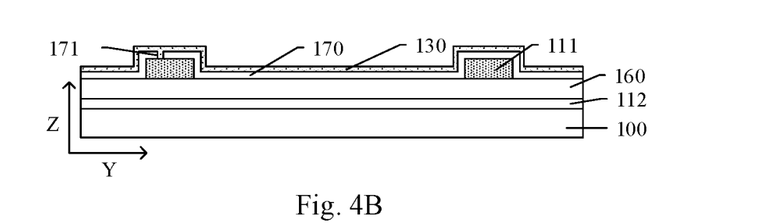
FIG. 4B is a partial cross-sectional view of the array substrate as illustrated in FIG. 4A taken along DD line.

For example, FIG. 4A is a plan view illustrating a partial structural of an array substrate provided by another example of an embodiment of the present disclosure, and FIG. 4B is a partial cross-sectional view of the array substrate as illustrated in FIG. 4A taken along DD line. As illustrated in FIG. 4A and FIG. 4B, the light-shielding layer 130 is located at a side of the display electrode 1120 away from the base substrate 100. For example, the pixel electrode 111 and the common electrode 112 included in the display electrode 1120 both are disposed on the base substrate 100, and the light-shielding layer 130 is located at a side of the pixel electrode 111 and the common electrode 112 away from the base substrate 100. The present example describes the case where the pixel electrode 111 is located at a side of the common electrode 112 away from the base substrate 100 while the light-shielding layer 130 is located at a side of the pixel electrode 111 away from the common electrode 112. The present example is not limited thereto, and it's also possible that the common electrode is located at a side of the pixel electrode away from the base substrate while the light-shielding layer is located at a side of the common electrode away from the pixel electrode; or one of the common electrode and the pixel electrode is disposed on the base substrate while the light-shielding layer is located at a side of the electrode disposed on the base substrate away from the base substrate. When the light-shielding layer is located at a side of the display electrode away from the base substrate, the number of film layers to be passed through by the ambient light for the ambient light to be incident into the light-shielding layer is relatively small, and the travel distance of the ambient light is short, so as to reduce the loss of the incident light and the light reflected to the outside by the reflecting surface of the light-shielding layer, thereby increasing the light utilization of the display device including the array substrate.

For example, the display electrode 1120 includes at least one of the pixel electrode 111 and the common electrode 112, and one electrode of the display electrode 1120 close to the light-shielding layer 130 is electrically connected to the light-shielding layer 130. In the present example, the display electrode 1120 includes the pixel electrode 111 and the common electrode 112, and one of the pixel electrode 111 and the common electrode 112 on the base substrate 100 that is closer to the light-shielding layer 130 is electrically connected with the light-shielding layer 130. FIG. 4A and FIG. 4B schematically illustrate that the pixel electrode 111 is an electrode which is disposed on the base substrate 100 and close to the light-shielding layer 130, a transparent insulating layer 170 can be disposed between the pixel electrode 111 and the light-shielding layer 130, the transparent insulating layer 170 includes a via hole 171, and then the pixel electrode 111 is electrically connected with the light-shielding layer 130 through the via hole 171 so as to prevent the light-shielding layer 130 from influencing the electric field which is generated by the pixel electrode 111 and the common electrode 112 and is acted on the liquid crystal molecules located in the annular region. The present example is not limited thereto, and it's also possible that the common electrode is an electrode which is disposed on the base substrate and close to the light-shielding layer, and then the common electrode is electrically connected with the light-shielding layer.

For example, as illustrated in FIG. 4B, a difference between a distance from the display electrode (e.g., the pixel electrode 111) electrically connected with the light-shielding layer 130 to the base substrate 100, and a distance from the light-shielding layer 130 to the base substrate 100, is smaller than 1 μm; that is, the difference between the distance from the display electrode electrically connected with the light-shielding layer 130 to the base substrate 100, and the distance from the light-shielding layer 130 to the base substrate 100, is equal to a thickness of one transparent insulating layer 170.

Figure 5:
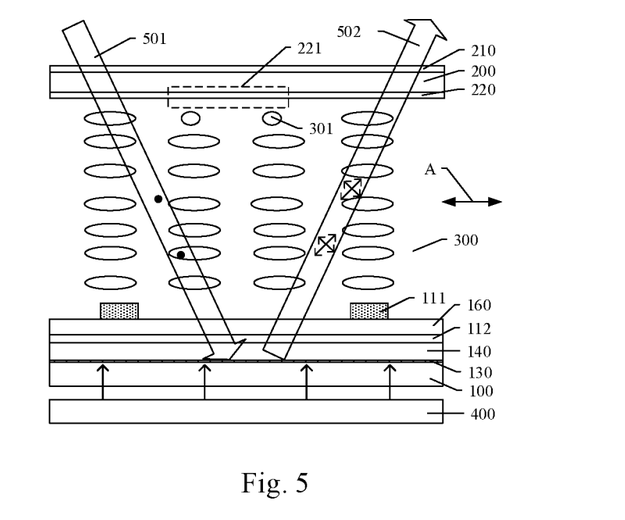
FIG. 5 is a partial cross-sectional view of a display device provided by an embodiment of the present disclosure under normal black mode.

FIG. 5 is a partial cross-sectional structural view of a display device provided by an embodiment of the present disclosure under normal black mode. As illustrated in FIG. 5, the display device provided by the present embodiment includes the array substrate described in any of the examples and embodiments above. FIG. 5 schematically illustrates that the array substrate in the display device is the array substrate illustrated in FIG. 3B, without limited thereto. As illustrated in FIG. 5, the display device further includes an opposing substrate 200 disposed opposite to the array substrate, for example, the opposing substrate 200 is a color filter substrate. The display device further includes: a liquid crystal layer 300 located between the array substrate and the opposing substrate 200; an alignment film 220 located at a side of the opposing substrate 200 facing the liquid crystal layer 300; a polaroid 210 located at a side of the opposing substrate 200 away from the liquid crystal layer 300; and a backlight source 400 located at a side of the array substrate away from the liquid crystal layer 300. A thickness of a portion of the liquid crystal layer 300 located in the annular region is substantially the same as a thickness of a portion of the liquid crystal layer 300 located in the light-transmitting region surrounded by the annular region; for example, an optical path of light that is emitted from the backlight source 400 and directly exits from the light-transmitting region is one half of an optical path of ambient light 501 which is reflected by the light-shielding layer 130 and then exits from the light-emitting side of the display device; with the arrangement of the light-shielding layer having the reflecting surface, the ambient light incident onto the light-shielding layer can be reflected to the display side of the display device to increase the display brightness of the annular region.

The display device in the present embodiment is a normal black display device; that is, when a difference between the voltage applied on the pixel electrode and the voltage applied on the common electrode is 0V, the liquid crystal molecules are not rotated, and linearly polarized light incident onto the liquid crystal layer from the backlight source 400 cannot exit from the polaroid 210, so that the display device displays a black screen.

For example, as illustrated in FIG. 5, after performing an alignment process, such as a rubbing alignment process, to the alignment film 220, the alignment film 220 has a uniform alignment direction, that is, the direction A. As illustrated in FIG. 5, the spacer (not illustrated) slides into the display region due to the local displacement of the array substrate and the opposing substrate 200, resulting in that a scratched area 221 is occurred on the alignment film 220 having been scratched by the spacer, and the alignment direction of the scratched area 221 on the alignment film 220 is destroyed, for example, the alignment direction is no longer the direction A; in this way, the liquid crystal molecules 301 located in the scratched area 221 are not aligned along the original alignment direction any more, which generates a disordered deflected angle.

As illustrated in FIG. 5, along a direction perpendicular to the base substrate 100, a position exactly corresponding to the scratched area 221 of the alignment film 220 is provided with the light-shielding layer 130 so as to prevent backlight from exiting the scratched area 221; in this way, it can avoid the occurrence of "blue spot" phenomenon when the display device is in a black screen mode or a low-contrast grayscale display mode.

For example, the ambient light 501 that is incident into the liquid crystal layer 300 through the polaroid 210 is linearly polarized light (having a polarization direction perpendicular to the direction A), the linearly polarized light would not change its polarization direction when passing through the liquid crystal molecules which are not rotated. The linearly polarized light that is incident onto and reflected by the reflecting surface of the light-shielding layer 130 becomes elliptically polarized light 502, and the elliptically polarized light can pass through the above-mentioned liquid crystal layer 300 and polaroid 210 and then exit from the display side of the display device, so as to increase the display brightness and utilize the light energy of ambient environment to achieve energy-saving driving, thereby improving the optical utilization and also protecting the eyesight.

For example, FIG. 5 schematically illustrates the state of incident light incident into the light-shielding layer 130 and the state of light reflected by the light-shielding layer 130 under black screen mode. However, under the grayscale display mode (not illustrated), the incident light incident into the light-shielding layer 130 is not linearly polarized light any more but is elliptically polarized light. That is to say, when the pixel electrode 111 is applied with a driving voltage, the electric field generated between the pixel electrode 111 and the common electrode 112 drives the liquid crystal molecules to rotate, so that the incident light incident into the light-shielding layer 130 is elliptically polarized light and the light reflected by the light-shielding layer 130 is also elliptically polarized light; the elliptically polarized light can pass through the above-mentioned liquid crystal layer 300 and the polaroid 210 and then exit from the display side of the display device.

For example, the display device can be a display device such as a liquid crystal display device, and any product or component including the display device and having display functions, such as a television, a digital camera, a mobile phone, a watch, a tablet computer, a notebook computer and a navigator device, without particularly limited the present embodiment thereto.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments of the present disclosure can be combined.

The above are only specific implementations of the present disclosure, and the protection scope of the present disclosure is not limited thereto. The protection scope of the present disclosure should be based on the protection scope of the appended claims.

The invention claimed is:

1. An array substrate, comprising:
a base substrate; and
a plurality of pixel units disposed on the base substrate, a plurality of gate lines and a plurality of data lines disposed on the base substrate, the plurality of gate lines extending along a first direction, the plurality of data lines extending along a second direction intersected with the first direction, the plurality of gate lines and the plurality of data lines defining the plurality of pixel units, each of the plurality of pixel units comprising an active display region, the active display region of at least one of the plurality of pixel units being provided with a light-shielding layer, the light-shielding layer being located at an edge of the active display region, and a surface of the light-shielding layer away from the base substrate being a reflecting surface,
wherein the light-shielding layer is disposed within an annular region, the annular region has a width in a range of 20 μm-50 μm, the light-shielding layer is disposed within the annular region which is located at the edge of the active display region and has the width of 20 μm-50 μm, and an outer boundary of the annular region is a boundary of the active display region, and an orthographic projection of the light-shielding layer on the base substrate does not overlap with both of orthographic projections of the plurality of gate lines on the base substrate and orthographic projections of the plurality of data lines on the base substrate.

2. The array substrate according to claim 1, wherein the light-shielding layer is disposed within the annular region having a width of 20 µm.

3. The array substrate according to claim 1, wherein a region in the active display region surrounded by the annular region is a light-transmitting region.

4. The array substrate according to claim 1, wherein the light-shielding layer has an annular shape.

5. The array substrate according to claim 4, wherein the light-shielding layer is a ring having a width in a range of 15 µm-40 µm.

6. The array substrate according to claim 4, wherein an outer boundary of the light-shielding layer is coincident with the outer boundary of the annular region.

7. The array substrate according to claim 1, wherein the at least one of the plurality of pixel units comprises a display electrode which is a planar electrode, and
wherein an orthographic projection of the display electrode on the base substrate overlaps with an orthographic projection of the light-shielding layer on the base substrate.

8. The array substrate according to claim 7, wherein the light-shielding layer is located at a side of the display electrode away from the base substrate.

9. The array substrate according to claim 8, wherein the display electrode comprises at least one of the pixel electrode and a common electrode, and
one of the pixel electrode and the common electrode close to the light-shielding layer is electrically connected with the light-shielding layer.

10. The array substrate according to claim 9, wherein a distance from the display electrode electrically connected with the light-shielding layer to the base substrate and a distance from the light-shielding layer to the base substrate have a difference smaller than 1 µm.

11. The array substrate according to claim 7, wherein the light-shielding layer is located between the display electrode and the base substrate.

12. The array substrate according to claim 11, wherein a transparent insulating layer is disposed between the display electrode and the light-shielding layer, and a material of the transparent insulating layer comprises a mixture of barium titanate and polyimide.

13. The array substrate according to claim 12, wherein a thickness of the transparent insulating layer is in a range of 0.1 µm-0.5 µm.

14. The array substrate according to claim 1, wherein a thickness of the light-shielding layer is in a range of 0.1 µm-0.5 µm.

15. A display device, comprising:
an array substrate, an opposing substrate, and a liquid crystal layer located between the array substrate and the opposing substrate,
wherein the array substrate comprises a base substrate and a plurality of pixel units disposed on the base substrate, a plurality of gate lines and a plurality of data lines disposed on the base substrate, the plurality of gate lines extending along a first direction, the plurality of data lines extending along a second direction intersected with the first direction, the plurality of gate lines and the plurality of data lines defining the plurality of pixel units, each of the plurality of pixel units comprises an active display region, the active display region of at least one of the plurality of pixel units is provided with a light-shielding layer, the light-shielding layer is located at an edge of the active display region, and a surface of the light-shielding layer away from the base substrate is a reflecting surface, the light-shielding layer is disposed within an annular region, the annular region has a width in a range of 20 µm-50 µm, the light-shielding layer is disposed within the annular region which is located at the edge of the active display region and has the width of 20 µm-50 µm, and an outer boundary of the annular region is a boundary of the active display region, and an orthographic projection of the light-shielding layer on the base substrate does not overlap with both of orthographic projections of the plurality of gate lines on the base substrate and orthographic projections of the plurality of data lines on the base substrate,
wherein a thickness of a portion of the liquid crystal layer located in the annular region is substantially the same with a thickness of a portion of the liquid crystal layer located in a light-transmitting region surrounded by the annular region, and the display device is a normal black display device.

16. The array substrate according to claim 1, wherein the at least one of the plurality of pixel units provided with the light-shielding layer comprises a blue pixel unit.

17. An array substrate, comprising:
a base substrate; and
a plurality of pixel units disposed on the base substrate, a plurality of gate lines and a plurality of data lines disposed on the base substrate, the plurality of gate lines extending along a first direction, the plurality of data lines extending along a second direction intersected with the first direction, the plurality of gate lines and the plurality of data lines defining the plurality of pixel units, each of the plurality of pixel units comprising an active display region, the active display region of at least one of the plurality of pixel units being provided with a light-shielding layer, the light-shielding layer being located at an edge of the active display region, and a surface of the light-shielding layer away from the base substrate being a reflecting surface,
wherein the light-shielding layer is disposed within the annular region having a width of 20 µm, the light-shielding layer is disposed within the annular region which is located at the edge of the active display region and has the width of 20 µm, an outer boundary of the annular region is a boundary of the active display region, a region in the active display region surrounded by the annular region is a light-transmitting region, and the light-shielding layer has an annular shape, and an orthographic projection of the light-shielding layer on the base substrate does not overlap with both of orthographic projections of the plurality of gate lines on the base substrate and orthographic projections of the plurality of data lines on the base substrate.

18. The array substrate according to claim 17, wherein the at least one of the plurality of pixel units comprises a display electrode which is a planar electrode, and
wherein an orthographic projection of the display electrode on the base substrate overlaps with an orthographic projection of the light-shielding layer on the base substrate.

19. The array substrate according to claim 18, wherein the light-shielding layer is located at a side of the display electrode away from the base substrate.

20. The array substrate according to claim 18, wherein the light-shielding layer is located between the display electrode and the base substrate.

\* \* \* \* \*